March 2, 1926.
J. H. ROGERS
CONDIMENT HOLDER
Filed July 14, 1925
1,575,506
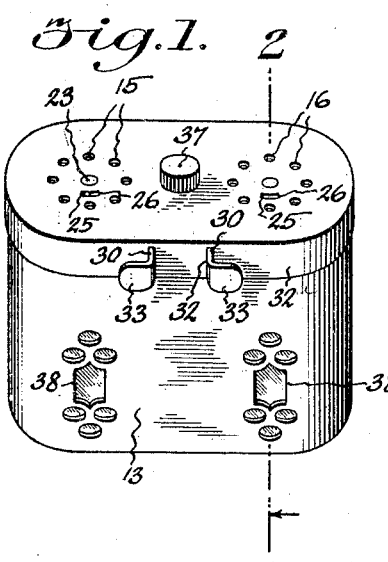
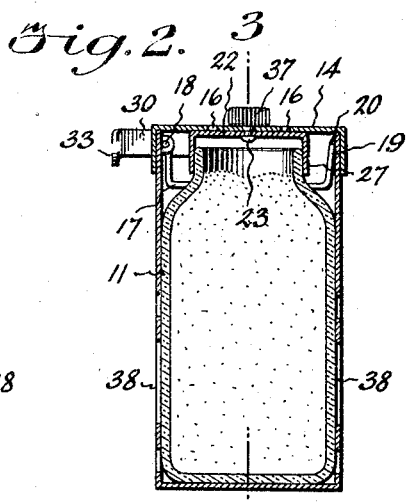
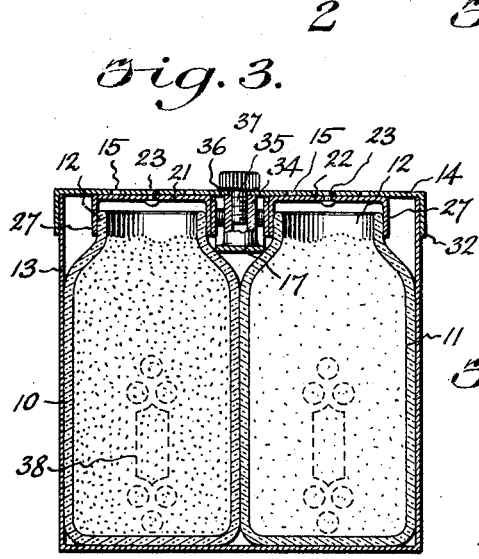
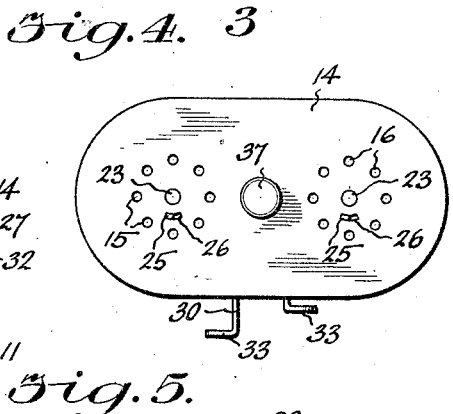
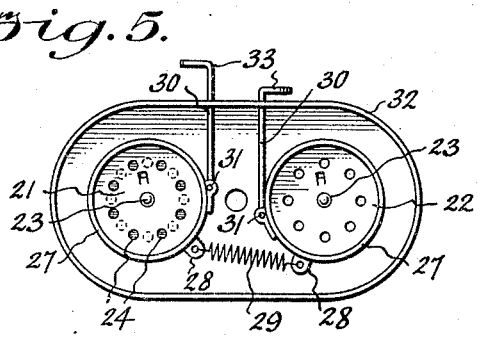
WITNESSES
INVENTOR
JOEL H. ROGERS
BY
ATTORNEYS Patented Mar. 2, 1926.

1,575,506

UNITED STATES PATENT OFFICE.

JOEL H. ROGERS, OF NEWARK, NEW JERSEY, ASSIGNOR OF ONE-HALF TO ALBERT BERG, OF NEWARK, NEW JERSEY.

CONDIMENT HOLDER.

Application filed July 14, 1925. Serial No. 43,574.

*To all whom it may concern:*

Be it known that I, JOEL H. ROGERS, a citizen of the United States, and a resident of Newark, in the county of Essex and State of New Jersey, have invented a new and Improved Condiment Holder, of which the following is a full, clear, and exact description.

This invention relates to condiment holders and has particularly reference to a holder constituting a container for a plurality of condiments and by means of which the condiments may be singly or collectively dispensed.

One of the principal objects of the present invention is to provide a condiment holder by means of which the condiments will be protected against the entrance of moisture, dust, or other foreign matter, so that they will be maintained in a clean, sanitary and usable condition at all times.

More specifically the invention comprehends a condiment holder including a plurality of receptacles having open upper ends and a housing therefor including a body and a cover having sets of dispensing openings disposed, respectively, in register with the open ends of the receptacles and means on the cover for independently closing the dispensing openings and for permitting of the independent opening of said dispensing openings whereby to discharge the contents singly or collectively.

The invention aims as a still further object to provide a condiment holder which is comparatively simple in its construction, inexpensive to manufacture and which is highly efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view of a condiment holder constructed in accordance with the invention;

Fig. 2 is a vertical transverse section therethrough taken approximately on the line 2—2 of Fig. 1;

Fig. 3 is a vertical sectional view taken approximately on the line 3—3 of Fig. 2;

Fig. 4 is a top plan view;

Fig. 5 is an inverted view of the cover removed from the body of the housing.

Referring to the drawings by characters of reference, 10 and 11 designate respectively, receptacles for different condiments, each of which is of substantially bottle shape having a restricted upper open end 12. A housing or casing including a body 13, is designed to receive the receptacles 10 and 11 in side-by-side relation. The housing or casing is closed at its upper end by a telescopic cover 14, which is formed with sets of discharge or sifter openings 15 and 16, respectively disposed in registry with the upper reduced open ends 12 of the receptacles 10 and 11 when the cover is in applied position. A bar 17 is hinged as at 18, at one of its extremities within the upper open end of the casing for swinging movement to a position transverse of the casing, to engage and maintain the receptacles 10 and 11 within the casing against shifting movement. The free terminal 19 of the bar is resilient and is designed to snap behind a keeper lug 20 formed within the casing.

In order to provide means for independently closing and opening the discharge or sifter openings 15 and 16, a pair of rotary closure members 21 and 22 are mounted for rotation on the under side of the cover 14 on journals or bearings 23. The members 21 and 22 are each formed with an annular concentric series of openings 24 corresponding to the discharge or sifter openings 15 and 16, so that relative rotation of the members 21 and 22 to the cover, respectively dispose the openings 24 into and out of registry with the openings 15 and 16. The members 21 and 22 are preferably of disk-like formation provided with depending annular flanges 27 of a diameter to snugly fit over the upper reduced ends 12 of the receptacles 10 and 11, and said flanges are provided with radially projecting apertured ears 28 connected by a coiled contractile spring 29 which functions to normally shift the members to a position to dispose the openings 24 out of register with the openings 15 and 16. In order to provide means for manually shifting the members 21 and 22 in the opposite direction to bring the sifter openings into registry for discharging the contents of the receptacles, a sifter arm 30 is pivotally connected at 31 to the outer periphery of the flange 27 of each member 21 and 22, said sifter arms extending through slots or openings 32 in the cover flange 32ª. At the outer ends the arms 30 are provided with finger-engaging terminals 33. Under this arrangement, it is obvious that either one or both of the arms may be shifted for simultaneously or singly discharging the contents of the receptacles.

In order to provide means for locking and retaining the cover in applied position to the body of the housing or casing, an internally threaded upwardly projecting boss 34 is formed on the cross bar 17 and the threaded shank 35 of a thumb screw is passed through an opening 36 in the cover with the knurled head 37 overlying the same. The receptacles 10 and 11 are preferably of glass or any other suitable transparent material and the side walls of the housing body are formed with vertical display openings or slots 38 through which the contents of the receptacles may be observed so that the user may learn when the receptacles need refilling.

What is claimed is:

1. A condiment holder comprising a housing, a plurality of condiment receptacles, each having an open upper end, means for normally retaining the receptacles within the housing, a cover for said housing having sets of sifter openings therein disposed respectively in alinement with the open ends of the condiment receptacles and shiftable inverted cup-shaped closure plates mounted on the under side of the cover and having complementary sifter openings therein, said closure plates embracing the upper open ends of the receptacles, and means connected therewith and extending through the cover for independently shifting the same to closed and open relation to the sets of sifter openings in the cover.

2. A condiment holder comprising a housing, a plurality of condiment receptacles, each having an open upper end, means for normally retaining the receptacles within the housing, a cover for said housing having sets of sifter openings therein disposed respectively in alinement with the open ends of the condiment receptacles and shiftable inverted cup-shaped closure plates mounted on the under side of the cover and having complementary sifter openings therein, said closure plates embracing the upper open ends of the receptacles, and means connected therewith and extending through the cover for independently shifting the same to closed and open relation to the sets of sifter openings in the cover, said receptacles being of a transparent material and said housing having display openings for observing the contents of the receptacles.

3. A dispensing container, including a plurality of receptacles having upper open ends, a housing therefor including a body, a removable cover for said housing having sets of dispensing openings of various sizes and disposed, respectively, in alinement with the upper open ends of the receptacles, and means on the cover for independently closing and opening the sets of dispensing openings, said means embracingly engaging over the upper open ends of the receptacles.

JOEL H. ROGERS.